United States Patent [19]

Lowenschuss

[11] 4,267,596
[45] May 12, 1981

[54] DIGITAL MEMORY SYSTEM

[75] Inventor: Oscar Lowenschuss, Goleta, Calif.

[73] Assignee: Raytheon Company, Lexington, Mass.

[21] Appl. No.: 891,794

[22] Filed: Mar. 30, 1978

[51] Int. Cl.³ .......................................... H04B 15/00
[52] U.S. Cl. ........................................ 455/18; 455/1; 375/3
[58] Field of Search ................ 365/45; 455/1, 17, 18, 455/19; 375/3, 4; 343/6.8 R, 6.8 LC; 330/124

[56] References Cited

U.S. PATENT DOCUMENTS

| | | | |
|---|---|---|---|
| 3,145,380 | 8/1964 | Currie | 343/6.8 LC |
| 3,187,258 | 6/1965 | Zolnik | 455/18 |
| 3,524,201 | 8/1970 | Land, Jr. | 343/6.8 R |
| 3,600,685 | 8/1971 | Doyle | 455/1 |
| 3,947,827 | 3/1976 | Dautremont, Jr. et al. | 340/173 RC |
| 3,991,409 | 11/1976 | Dautremont, Jr. et al. | 340/173 R |

Primary Examiner—Benedict V. Safourek
Attorney, Agent, or Firm—Richard M. Sharkansky; Milton D. Bartlett; Joseph D. Pannone

[57] ABSTRACT

A digital memory system adapted to store a sequence of one bit quantized samples of an input signal having a frequency within a predetermined band of frequencies and to produce a replica of such input signal from such stored one bit samples. A control signal is produced indicative of the particular portion of the band of frequencies which includes the frequency of the input signal. A plurality of filters is provided, each one tuned to a different portion of the band. In response to the control signal the sequence of bits read from memory passes through the filter which is tuned to the portion of the band which includes the frequency of the input signal. With such arrangement many unwanted harmonics produced because of the one bit quantization of the input signal are removed.

4 Claims, 8 Drawing Figures

DIGITAL MEMORY SYSTEM

BACKGROUND OF THE INVENTION

This invention relates generally to digital memory systems and more particularly to digital memory systems which are adapted to store radio frequency signals and to enable subsequent retransmission of such signals.

As is known in the art, it is frequently desired to store a received radio frequency signal and later retransmit such signal. In one such system the received radio frequency signal is periodically sampled at or above the Nyquist frequency, each sample is next converted into a corresponding digital word and each digital word is then stored in a digital memory. When it is desired to retransmit, the stored digital words are sequentially read from the memory in the sequence in which they were stored and such digital words are converted into corresponding voltages to produce a radio frequency signal which is amplified and retransmitted.

With such arrangement the degree to which the retransmitted radio frequency signal resembles the received radio frequency signal is related, inter alia, to the degree of quantization of the samples, i.e. the number of bits in each digital word. On the other hand, the cost, weight and size of the memory system increases as the degree of quantization increases. In particular, as the number of bits representing each sample is reduced the retransmitted radio frequency signal will, as a result of the quantization error, include, in addition to a radio frequency signal having the frequency of the received signal, unwanted harmonics or spurious signals which distort and reduce the amount of available power which may be used to amplify a radio frequency signal having the frequency of the received signal. For example, if one bit quantization is used the received radio frequency signal (within the predetermined band of frequencies $f_a$-$f_b$) is sampled at or below the Nyquist frequency (i.e. a frequency equal to or greater than $2f_b$) and is converted from a sinusoidal signal to a square wave signal having a repetition frequency equal to the frequency of the received signal, say a frequency $f_1$, where $f_b \geq f_1 \geq f_a$. As is known, while the frequency spectrum of an "unsampled" square wave includes a frequency component at the repetition frequency $f_1$, such spectrum also includes odd harmonics $3f_1$, $5f_1$, . . . etc.; however, the frequency spectrum of a "sampled" square wave signal includes the frequency spectrum of an "unsampled" square wave signal "folded" repeatedly about harmonics of the sampling frequency. Therefore, because the sampling frequency $2f_b$ may be less than twice the frequency of, say, the third or fifth harmonic of the square wave signal (i.e. $6f_1$, $10f_1$), the frequency spectrum of the sampled square wave signal may include, in addition to a frequency component $f_1$, unwanted harmonics produced by the "folding". As described above, these unwanted harmonic components distort and reduce the amount of available fundamental frequency power which may be used to amplify a radio frequency signal having the frequency of the received signal.

SUMMARY OF THE INVENTION

With this background of the invention in mind it is an object of this invention to provide an improved digital memory system.

It is another object of this invention to provide an improved digital memory system adapted to store radio frequency signals and enable subsequent transmission of such signals.

It is still another object of this invention to provide an improved digital memory system wherein samples of a received radio frequency signal are converted into corresponding digital words, each one being represented by a minimum number of bits, such digital words being stored and later retrieved to produce a replica of the received radio frequency signal with minimum harmonics or spurious components.

These and other objects of the invention are attained generally by providing: (a) means for producing an intermediate signal having amplitude variations representing quantized amplitude variations of an input signal having a frequency $f_1$ within a predetermined band of frequencies, such intermediate signal having a frequency component, $f_1$, and additional unwanted frequency components within the predetermined band of frequencies resulting from quantization of the amplitude variations of the input signal; (b) a plurality of bandpass filters, each one thereof tuned to a different portion of the predetermined band of frequencies; and (c), means for coupling the intermediate signal to the one of the plurality of filters tuned to the portion of the predetermined band of frequencies which includes the frequency $f_1$ of the input signal removing additional unwanted frequency components in the predetermined band of frequencies and producing an output signal having a frequency component $f_1$.

In a preferred embodiment of the invention the input signal is converted into a series of binary signals, i.e. a series of one bit digital words. The series of binary signals is stored in a digital memory. The input signal is also fed to a pair of filters, one of such pair of filters passing signals within the upper half of the predetermined band of frequencies and the other filter passing signals within the lower half of the band of frequencies. As the input signal is converted into a series of binary words a binary control signal is produced in response to the output of the filter indicating whether the frequency of the input signal is in the upper half or lower half of the predetermined band of frequencies.

When the digital words are retrieved from the memory an intermediate signal is produced having unwanted frequency components within the predetermined band of frequencies because of the quantization and concomitant folding of the harmonics. To remove some of these unwanted frequency components the intermediate signal is passed through a gate to one of a pair of output filters selectively in accordance with the aforementioned control signal. One of such output filters is tuned to the upper half of the predetermined band of frequencies and the other output filter is tuned to the lower half of the band. If the control signal indicates that the input signal has a frequency within the upper half of the band the intermediate signal is passed through the output filter which is tuned to the upper half of the band and, conversely, if the input signal has a frequency within the lower half of the band the intermediate signal is passed to the output filter which is tuned to the lower half of the band.

With such arrangement all unwanted harmonics within one of the two halves of the predetermined band of frequencies are rejected by one of the pair of output filters thereby reducing distortion in the output signal and enabling a greater amount of available power to amplify the desired frequency component of the signal produced at the output of the pair of output filters.

BRIEF DESCRIPTION OF THE DRAWINGS

The foregoing features of this invention as well as the invention itself may be more fully understood from the following detailed description read together with the accompanying drawings, in which.

DESCRIPTION OF THE PREFERRED EMBODIMENT

Figure 1:
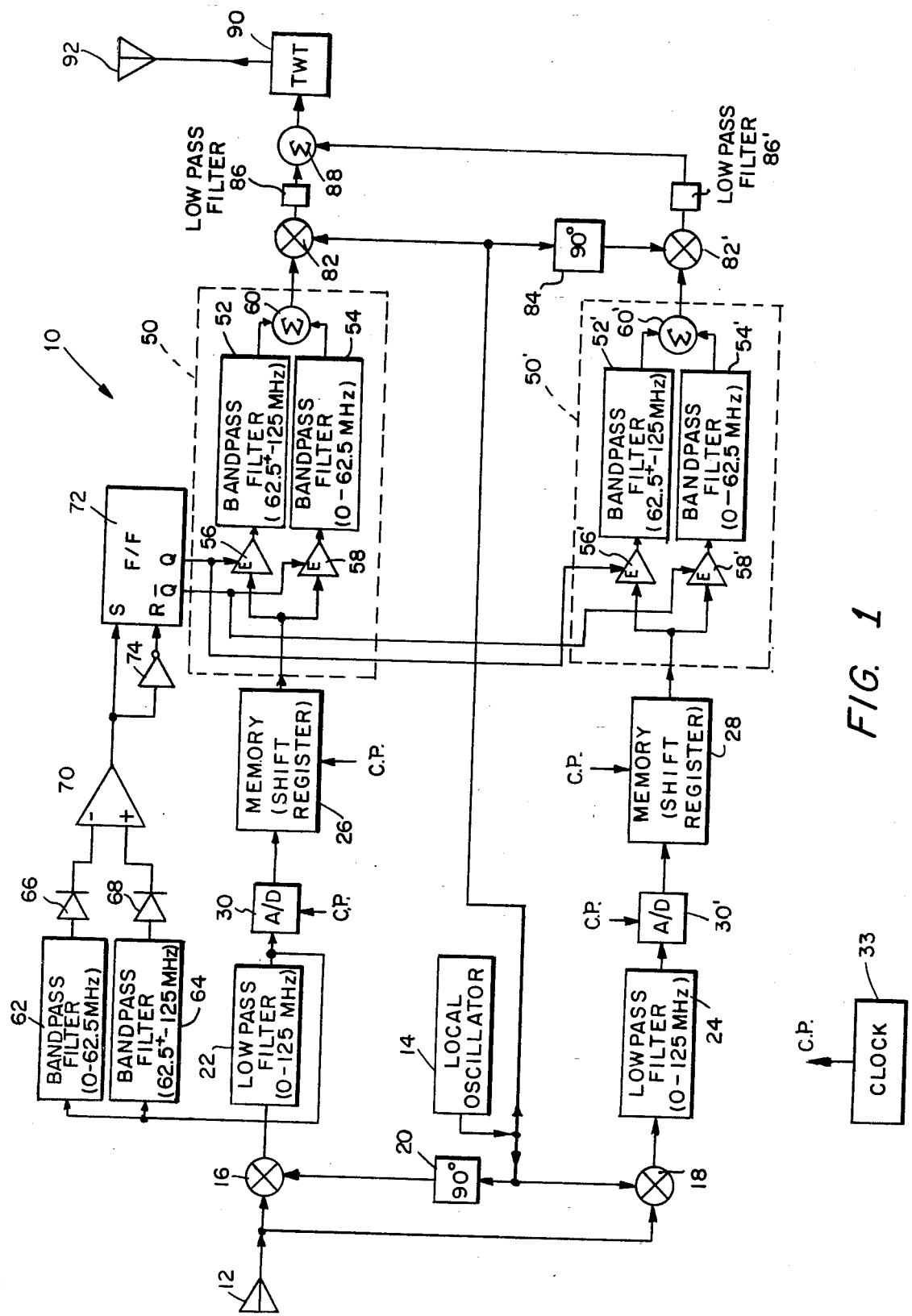
FIG. 1 is a block diagram of a radio frequency signal receiver/transmitter system according to the invention.

Referring now to FIG. 1, radio frequency signal receiver/transmitter system 10 adapted to store radio frequency signals and to enable subsequent retransmission of such signals is shown. Such system 10 includes a receiving antenna 12 of any conventional design to receive radio frequency signals. Such radio frequency signals are here within the bandwidth of the system 10, here, for example, 1 GHz±125 MHz. The received radio frequency signals are separated into a pair of quadrature signals in a conventional manner by heterodyning such received signals with in-phase and quadrature phase components of a local oscillator signal. In particular, a local oscillator 14, here of any conventional design and adapted to produce a signal having a frequency at the middle of the bandwith of the system 10, here 1 GHz, is fed to a mixer 18 and such local oscillator signal is also passed through a ninety degree phase shifter 20 to a mixer 16, as shown. The heterodyning process translates the frequency of the received signal to a pair of quadrature signals having a frequency within the band 0 to 125 MHz. The signals produced by the pair of mixers 16, 18 are passed through low pass filters 22, 24, as shown, each one of such filters 22, 24 having a cutoff frequency in the order of 125 MHz to reject higher order harmonics and intermodulation signals produced in the mixing process. It follows then that a received signal having a frequency within the bandwidth of system 10 will pass through the low pass filters 22, 24 and all harmonics produced by the mixing process will be substantially rejected by such filters 22, 24.

The signal produced at the output of low pass filter 22 provides, inter alia, an input signal to digital memory 26 and the signal produced at the output of low pass filter 24 provides an input signal to digital memory 28. Each one of the digital memories 26, 28 is identical in construction and is fed by analog-to-digital (A/D) converters 30, 30', respectively. Here such A/D converters 30, 30' are one bit A/D converters and each produce a one bit digital word representative of the amplitude of the input signals fed thereto at each instant a clock pulse (cp) is applied thereto. Because the input signals fed to A/D converters 30, 30' have a frequency within a bandwidth 0 to 125 MHz the input signals are sampled at or above the Nyquist frequency (i.e. equal to or greater than twice the highest frequency in the band). That is, here clock pulses, cp, are applied to the A/D converters 30, 30' at a 250 MHz rate from a conventional clock pulse generator 33.

Figure 2A:
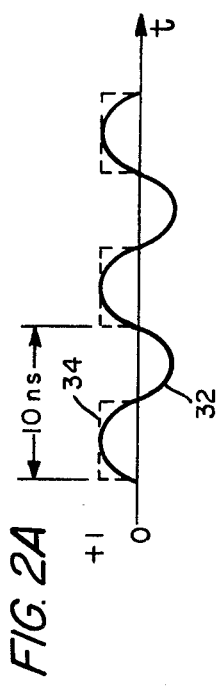
FIGS. 2A–2G are curves useful in understanding the operation of the system in FIG. 1.
Figure 2B:
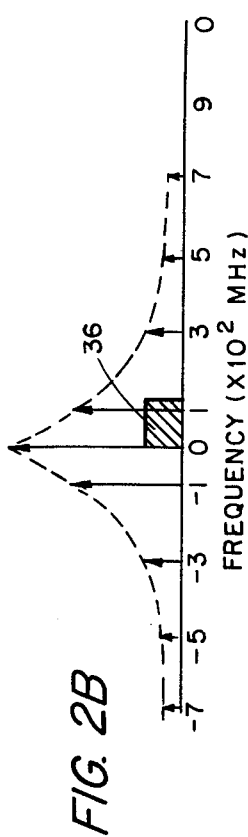

Referring also to FIG. 2A, an input signal 32 fed to A/D converter 30 is shown, here having a frequency of 100 MHz. Because the input signal 32 is being converted into a one bit digital word by A/D converter 30 the input signal 32 may be considered as a square wave signal 34, the amplitude of which is +1 when the input signal 32 has a positive level and the amplitude of which is 0 when the input signal 32 has a negative level. The frequency spectrum of the square wave signal 34 may be represented as:

$$\frac{A}{2} + \sum_{n=-\infty}^{\infty} \frac{A}{n} e^{-jn(2\pi f_1)t} \qquad \text{Eq. (1)}$$

where: A equals amplitude; n is an odd integer and $f_1$ is the repetition frequency of the square wave, here 100 MHz. The frequency spectrum of such square wave 34 for $n=0$ to $n=\pm 7$ is shown in FIG. 2B. It is noted that the effect of quantizing the input signal 32 to a one bit, or binary, signal is to produce a frequency spectrum which, in addition to having a frequency component at the frequency of the input signal 32 (i.e. $f_1 = 100$ MHz) includes odd harmonics (i.e. $3f_1 = 300$ MHz; $5f_1 = 500$ MHz; $7f_1 = 700$ MHz; etc.). (Also shown in such FIG. 2B is a region 36 representing a band of frequencies 0 to 125 MHz; i.e. the bandwidth of the input signals fed to A/D converter 30).

Figure 2C:
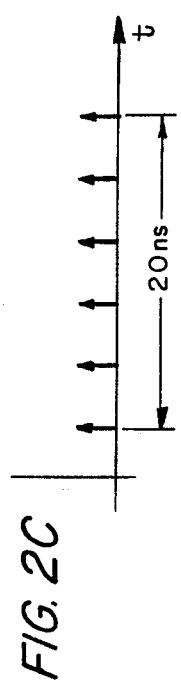

As discussed above, the A/D converter 30 is clocked at the clock rate $f_s$, here at least twice the highest frequency in the band of frequencies of the input signal fed to the A/D converter 30, i.e. here at $f_s$ is at a frequency of at least 250 MHz as shown in FIG. 2C. It is noted from FIG. 2B that while the sampling frequency (or clock frequency) $f_s$ is equal to twice the highest frequency expected for the input signal fed to the A/D converter 30, such sampling frequency $f_s$ does not satisfy the Nyquist frequency for all frequency components of the square wave signal as shown in FIG. 2B. In particular, while the sampling frequency $f_s$ is satisfactory for the fundamental frequency component $f_1$ of the input signal, such as inadequate for the higher order harmonics $3f_1$, $5f_1$, $7f_1$, etc., such harmonics being in effect generated by the quantization error produced by using a one bit A/D converter 30.

The one bit digital words (i.e. each word being either a logical 1 or logical 0) are clocked into each memory 26, 28 (here a shift register) (FIG. 1) in response to clock pulses cp, here also at a rate of 250 MHz. After the shift registers 26, 28 are full the one bit digital words are clocked out of the shift registers 26, 28, here at the rate of 250 MHz, in response to clock pulses cp. Considering shift register 26, for example, the signal produced at the output of the shift register 26 is a two-level signal representative of the levels of the square wave signal 34 (FIG. 2A) at the time the clock pulses (FIG. 2C) were fed to the A/D converter 30, such two-level signal 40 being shown in FIG. 2D. The frequency spectrum of such two-level signal 40 may be represented as:

$$\frac{A}{2} + \sum_{\substack{n=-\infty \\ m=-\infty}}^{\substack{n=\infty \\ m=\infty}} \frac{A}{n} e^{-j(n2\pi f_1 t + m2\pi f_s t)} \qquad \text{Eq. (2)}$$

where n is an odd integer and m is any integer.

Figure 2E:
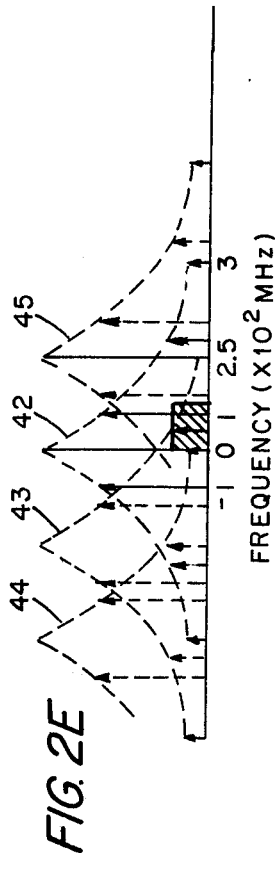
Figure 2D:
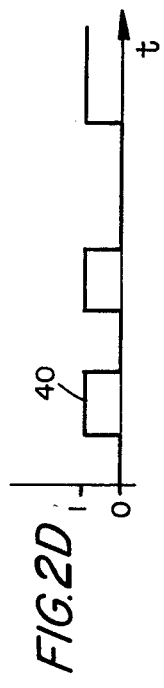
Figure 2F:
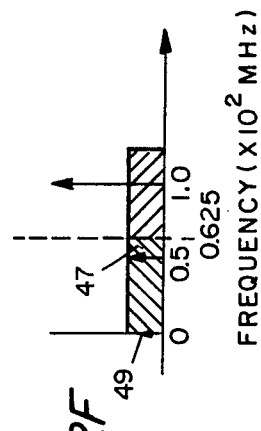
Figure 2G:
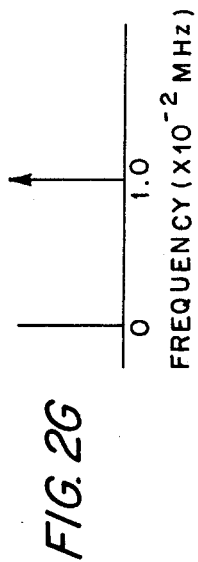

The effect of sampling by the A/D converter 30 is to "fold" the frequency spectrum of the square wave signal 34 (FIG. 2B) (i.e. the quantized input signal 32) about the sampling frequency $f_s$ and harmonics of such sampling frequencies (FIG. 2E). Because the frequency spectrum of the square wave signal includes frequency components at a frequency greater than twice the sampling frequency, unwanted harmonics are produced in the bandwidth 0 to 125 MHz as shown in FIG. 2E. That is, FIG. 2E shows: an envelope 42 of the frequency spectrum of the square wave signal when m=0 in Eq. (2); an envelope 43 of the frequency spectrum of the square wave signal when m=−1 in Eq. (2); an envelope 44 of the frequency spectrum of the square wave signal when m=−2; and an envelope 45 of the frequency spectrum of the square wave signal when m=+1. As a result of this sampling unwanted harmonic signals, here a third harmonic 47 (FIG. 2F) of the square wave signal, is "folded" into the bandwidth 0 to 125 MHz, here to a frequency of 50 MHz, and a fifth harmonic 49 (FIG. 2F) is "folded" into the bandwidth, here to a frequency near 0 MHz.

In order to remove these unwanted harmonic signals, i.e. harmonics 49, 47, the signals produced at the outputs of shift registers 26, 28 (FIG. 1) are fed to filter sections 50, 50', respectively, as shown in FIG. 1. Here each one of such filter sections 50, 50' includes two channels, one having bandpass filters 52, 52' for passing signals having a frequency within the upper half of the band 0 to 125 MHz (i.e. a frequency here 62.5+ MHz to 125 MHz) and the other channel having bandpass filters 54, 54' for passing signals having a frequency within the lower half of the band 0 to 125 MHz) (i.e. a frequency here 0 to 62.5 MHz.) In particular, the output of each one of the shift registers 26, 28 is coupled to a pair of gated amplifiers 56, 58 and 56', 58', respectively, as shown. The outputs of gated amplifiers 56, 56' are coupled to bandpass filters 52, 52', respectively, as shown, and the outputs of gated amplifiers 58, 58' are coupled to bandpass filters 54, 54', respectively, as shown. Gated amplifiers 56, 58 and 56', 58' are of any conventional design and are adapted to pass signals fed thereto from the shift registers 26, 28, respectively, when enabled by a "high" signal fed to terminal E thereof and to inhibit signals fed thereto from such shift registers 26, 28 when such gated amplifiers 56, 58, 56', 58' are disabled by a "low" signal fed to terminal E thereof. The outputs of the gated amplifiers 56, 58 and 56', 58' are coupled to conventional summing networks 60, 60', respectively, through filters 52, 54 and 52', 54', respectively, as shown, to produce the output signals for the filter sections 50, 50', respectively, as shown.

The input signal to A/D converter 30 is additionally fed to a pair of bandpass filters 62, 64, as shown. Bandpass filter 62 is adapted to pass signals fed thereto having a frequency within the lower half of the band 0 to 125 MHz (i.e. a frequency here 0 to 62.5 MHz) and bandpass filter 64 is adapted to pass signals fed thereto having a frequency within the upper half of the band of frequency, here 62.5+ MHz to 125 MHz. The outputs of bandpass filters 62, 64 are fed to conventional detectors 66, 68 which are fed to a comparator 70, as shown.

In operation if the input signal fed to the A/D converter 30 has a frequency within the upper half of the band (i.e. 62.5+ to 125 MHz), a "high" (logical 1) signal is produced at the output of comparator 70, whereas if the input signal has a frequency within the lower half of the band (i.e. 0 to 62.5 MHz) the comparator 70 produces a "low" signal (logical 0). The output of comparator 70 is fed to the set terminal (S) of a flip/flop 72 and to the reset terminal (R) of such flip/flop 72 through an inverter 74, as shown. It follows then that if the input signal has a frequency within the upper half of the band the flip/flop 72 is placed in a "set" condition and a high signal is produced at output terminal Q and a low signal is produced at output terminal $\overline{Q}$, whereas if the input signal is in the lower half of the band terminal Q produces a low signal and terminal $\overline{Q}$ produces a high signal.

Terminal Q is coupled to the E terminals of gated amplifiers 56, 56' and terminal $\overline{Q}$ is coupled to the E terminals of gated amplifiers 58, 58', as shown. It follows then that if the input signal fed to A/D converter 30 is in the upper half of the band (i.e. 62.5+ to 125 MHz), gated amplifiers 56, 56' are enabled by the high signal at terminal $\overline{Q}$ to pass signals fed thereto from the shift registers 26, 28 to bandpass filters 52, 52', respectively, and if the input signal fed to A/D converter 30 is in the lower half of the band (i.e. 0 to 62.5 MHz), gated amplifiers 58, 58' are enabled by the high signal at terminal $\overline{Q}$ to pass the shift register output signals to bandpass filters 54, 54', respectively.

Referring now also to FIGS. 2A through 2G, it is noted that here the input signals fed to the A/D converters 30, 30' have a frequency within the upper half of the band, i.e. here a frequency of 100 MHz. Therefore, in response to the signal produced by comparator 70 the flip/flop 72 is placed in a set condition producing a high signal at terminal Q and a low signal at terminal $\overline{Q}$. In response to such signals gated amplifiers 56, 56' are enabled and gated amplifiers 58, 58' are disabled. Consequently, the third and fifth "folded" harmonics 47, 49 (FIG. 2F) (i.e. 50 MHz and 0 MHz, respectively) of the signals produced at the outputs of memories 26, 28 are rejected by filters 52, 52', while the component having a frequency of 100 MHz is passed by filters 52, 52'. The signals passed by filter sections 50, 50' are heterodyned with the local oscillator signals. In particular, the output of summing network 60 is heterodyned in mixer 82 with the local oscillator signal and the output of summing network 60' is heterodyned in mixer 82' with such local oscillator signal shifted in phase 90° by phase shifter 84. The output signals of mixers 82, 82' are filtered by low pass filters 86, 86', respectively, as shown, to remove harmonics produced in the heterodyning process. The signals passed by low pass filters 86, 86' are then combined by summing network 88, as shown, to form a radio frequency signal having a frequency 1.0 GHz±$f_1$, here 1.0 GHz±100 MHz. It is noted that the output of the summing network 68 has a single frequency component 1.0 GHz±100 MHz because the unwanted harmonics 47, 49 (FIG. 2F) have been removed by the filter sections 50, 50'. Therefore, substantially all of the power available to a traveling wave tube (TWT) amplifier 90 which is used to amplify such single frequency signal and such power is not wasted on the amplification of unwanted harmonics. The radio frequency signal amplified by TWT amplifier 90 is transmitted via a conventional antenna 92, as shown.

Having described a preferred embodiment of this invention, it is now evident that other embodiments incorporating these concepts may be used. It is felt, therefore, that this invention should not be restricted to the disclosed embodiment, but rather should be limited only by the spirit and scope of the appended claims.

What is claimed is:

1. A digital memory system, comprising:
 (a) means, fed by an input signal having a frequency within a predetermined band of frequencies, for producing a control signal indicative of the particular one of a plurality of different portions of the band of frequencies which includes the frequency of the input signal;

(b) means, fed by the input signal, for storing a sequence of one bit digital words, each one of such bits being representative of the amplitude of the input signal and for producing such sequence of stored digital words at an output of the storage means, such sequence of one bit digital words being produced as a train of pulses having a bandwidth greater than the predetermined band of frequencies; and (c) means, fed by the control signals and the train of pulses produced at the output of the storing means, for coupling to an output of the memory system a selected portion of the bandwidth of the train of pulses, comprising:

(i) a plurality of filters, each one being tuned to a corresponding one of the portions of the predetermined band of frequencies; and (ii) gating means, responsive to the control signal for passing the sequence of stored digital words produced at the output of the storing means to an output of the system through a selected one of the plurality of filters such selected one of the plurality of filters being the one of such filters which is tuned to the portion of the band of frequencies which includes the frequency of the input signal.

2. The system recited in claim 1 wherein the control signal producing means includes:

a second plurality of filters fed by the input signal, each one of such second plurality of filters being tuned to a corresponding one of the different portions of the predetermined band of frequencies.

3. The combination recited in claim 2 including:

(a) means for heterodyning the signal passed by the selected one of the second plurality of filters to a radio frequency signal; and (b) means for transmitting such radio frequency signal.

4. A digital memory system, comprising:

(a) means, fed by an input signal having a frequency within a predetermined band of frequencies, for producing a control signal indicative of the particular one of a plurality of different portions of the band of frequencies which includes the frequency of the input signal;

(b) means, fed by the input signal, for storing a sequence of one bit digital words, each one of such bits being representative of the amplitude of the input signal and for producing such sequence of stored digital words at an output of the storage means, such sequence of one bit digital words being produced as a train of pulses having a bandwidth greater than the predetermined band of frequencies; and (c) means, fed by the control signals and the train of pulses produced at the output of the storing means, for coupling to an output of the memory system a selected portion of the bandwidth of the train of pulses, such selected portion of the bandwidth of the train of pulses being the portion of the predetermined band of frequencies which includes the frequency of the input signal indicated by the control signal producing means.

* * * * *

UNITED STATES PATENT OFFICE
CERTIFICATE OF CORRECTION

Patent No. 4,267,596                    Dated May 12, 1981

Inventor(s)  Oscar Lowenschuss

It is certified that error appears in the above-identified patent and that said Letters Patent are hereby corrected as shown below:

Column 4, line 38, delete --as-- and replace with --is--;

Equation 2, top line, delete --m =~ -- and replace with --m =∞ --.

Signed and Sealed this

Twentieth Day of April 1982

[SEAL]

Attest:

GERALD J. MOSSINGHOFF

Attesting Officer         Commissioner of Patents and Trademarks